Patented Aug. 6, 1935

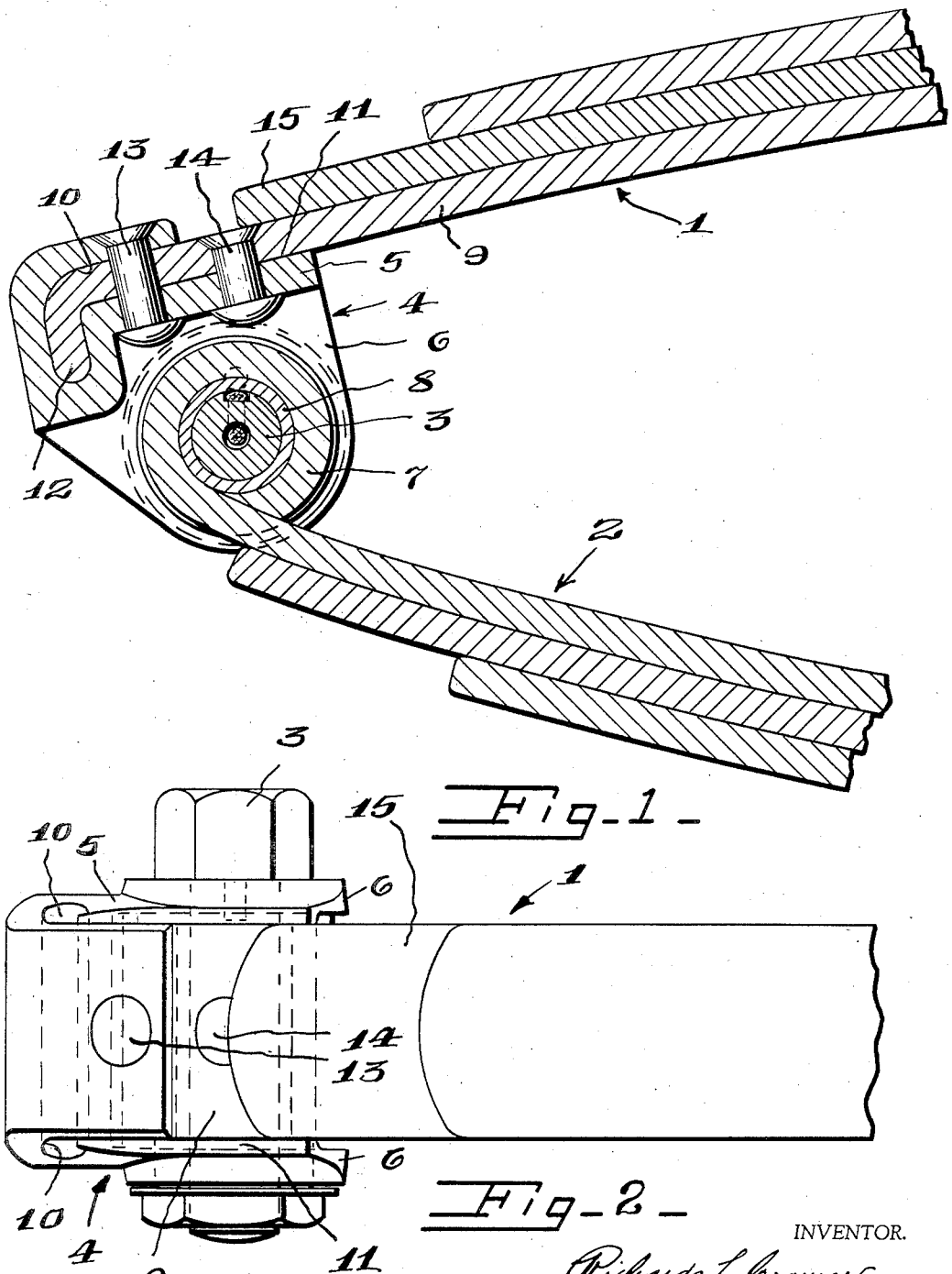

2,010,177

UNITED STATES PATENT OFFICE 2,010,177

JOINT FOR ELLIPTICAL SPRINGS

Richard L. Cramer, Baldwinsville, N. Y.

Application January 3, 1933, Serial No. 649,815

2 Claims. (Cl. 267—55)

This invention has for its object, a particularly simple and economical pivot, or spring bolt joint for full elliptical springs, or springs including upper and lower units which are connected at their ends by a pivot joint or spring bolt.

Heretofore, in full elliptical springs, the joint has been formed by a bracket welded to the main leaf of one of the spring units, usually to the main leaf of the upper unit. In welding the bracket which is steel, to the spring leaf, there is danger of burning the steel, making the joint weak, and liable to break, and extreme care must be used during the welding operation, and even then defects can not be detected.

The principal object of this invention is to apply the bracket to the spring leaf without welding, or the use of heat, and provide a joint which is at least equally as good as the joint produced by welding the bracket to the spring leaf, and at the same time more economical in the manufacture of the spring.

The invention consists in the novel features and in the combinations and constructions hereinafter set forth and claimed.

In describing this invention, reference is had to the accompanying drawing in which like characters designate corresponding parts in all the views.

Figure 1 is a longitudinal, fragmentary, sectional view of an elliptical spring provided with this joint.

Figure 2 is a plan view of parts seen in Figure 1.

I designates the upper spring unit, and 2 the lower unit of an elliptical spring which are connected together at their ends by a spring bolt 3. This bolt is usually carried in a bracket which is welded to the main leaf of one of the spring units.

This invention pertains to the elimination of the welding feature, and the attaching of the bracket to the main leaf of one of the spring units without welding.

4 designates the bracket, which includes the usual body 5 and downwardly extending sides or lugs 6 formed with openings in which the spring bolt 3 is mounted. As before stated, the bracket is preferably attached to the upper spring unit. The main leaf of the lower spring unit is therefore provided with the usual eye 7 through which the spring bolt 3 extends, a bushing 8 being interposed between the eye and the spring bolt. The spring bolts are usually provided with passages and ducts for a lubricant.

By my invention, the bracket 4 is mechanically secured to the main leaf 9 of one of the spring units, here shown as the main leaf of the upper spring unit, by interlocking the main leaf therewith, and as here illustrated, the bracket is formed with a transversely extending angular, or L shaped slot 10 opening through its opposite sides and with a bearing face 11 forming a continuation of one of the walls of one leg of the L shaped slot, and the main leaf 9 is provided with an angular, here shown as downturned end 12 fitting the slot, the under side of the main leaf 9 resting on the bearing surface 11. The end portion of the main leaf fits the slot with a tight, or drive fit. Thus, the main leaf is secured to the bracket 9 without the use of welding. Preferably, however, fastening members 13 and 14 are provided, these being rivets, the rivet 13 extending through opposite walls of the L shaped slot, and through the interposed portion of the main leaf 9 of the spring, and the rivet 14 extending only through the main leaf of the spring and the portion of the bracket provided with the bearing surface 11. The angular slot however, relieves the rivets to a large extent from any strains. The rivets have the heads on their upper sides countersunk, although this is unnecessary, except in the case of the rivet 14, the head of which must be flush, or below the upper surface of the main spring 9, in order to permit slipping and elongation of the leaf 15 overlying the main leaf, during the flattening of the elliptical spring.

This joint for elliptical springs is particularly economical in construction, and avoids the defects in the spring developed by welding, or other processes utilizing heat.

What I claim is:

1. A joint for elliptical springs comprising a bracket formed with a transversely extending L shaped slot for receiving the end portion of the main leaf of the spring, and with a bearing face forming a continuation of one side wall of the leg of the L shaped slot, on which bearing face the end portion of the main leaf bears, the main leaf being provided with an angular portion interlocking in and fitting the L shaped slot, the bracket being also formed with a spring bolt bearing located outside and spaced from the slot and having its axis extending in a direction transversely of the bracket, the bearing face extending beyond one side of a plane extending at an angle approaching a right angle to said bearing face containing the axis of the spring bolt bearing, and the angular portion in the slot being located on the opposite side of said plane.

2. A joint for elliptical springs comprising a bracket having a body formed with a transversely extending L shaped slot for receiving the end portion of the main leaf of the spring, and with lugs projecting at an angle to the body from opposite side edges of the body, and formed with a spring bolt bearing, the body being formed with a bearing face on its outer side forming a continuation of one side wall of the leg of the L shaped slot, and beyond the end face of the other wall of the leg of the L shaped slot, on which bearing face the end portion of the main leaf bears, the main leaf being provided with an angular portion interlocking and fitting the L shaped slot, and said bearing face on the body extending to one side of a plane containing the axis of the spring bolt bearing and intersecting the bearing face, and the angular end of the slot being located on the opposite side of said plane.

RICHARD L. CRAMER.